United States Patent
Kobayashi

(10) Patent No.: US 10,557,539 B2
(45) Date of Patent: Feb. 11, 2020

(54) WAVE GENERATOR AND STRAIN WAVE GEARING

(71) Applicant: HARMONIC DRIVE SYSTEMS INC., Shinagawa-ku, Tokyo (JP)

(72) Inventor: Masaru Kobayashi, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 416 days.

(21) Appl. No.: 15/519,677

(22) PCT Filed: Nov. 21, 2014

(86) PCT No.: PCT/JP2014/080959
§ 371 (c)(1),
(2) Date: Apr. 17, 2017

(87) PCT Pub. No.: WO2016/079876
PCT Pub. Date: May 26, 2016

(65) Prior Publication Data
US 2017/0254403 A1 Sep. 7, 2017

(51) Int. Cl.
*F16H 49/00* (2006.01)
*F16C 19/36* (2006.01)
*F16C 33/58* (2006.01)

(52) U.S. Cl.
CPC ......... *F16H 49/001* (2013.01); *F16C 19/364* (2013.01); *F16C 33/588* (2013.01); *F16C 2361/61* (2013.01); *F16H 2049/003* (2013.01)

(58) Field of Classification Search
CPC .................. F16H 49/001; F16H 2049/003
(Continued)

(56) References Cited

U.S. PATENT DOCUMENTS

| 8,646,360 B2 * | 2/2014 | Kanai | F16H 49/001 74/640 |
| 8,770,064 B2 * | 7/2014 | Zhang | F16H 1/321 74/640 |

(Continued)

FOREIGN PATENT DOCUMENTS

| JP | 06-193663 A | 7/1994 |
| JP | 2003-176857 A | 6/2003 |

(Continued)

OTHER PUBLICATIONS

International Search Report (PCT/ISA/210) dated Mar. 3, 2015, by the Japanese Patent Office as the International Searching Authority for International Application No. PCT/JP2014/080959 (5 pages).

(Continued)

*Primary Examiner* — Ha Dinh Ho
(74) *Attorney, Agent, or Firm* — Buchanan Ingersoll & Rooney PC

(57) ABSTRACT

A wave generator of a strain wave gearing has a rigid plug provided with an elliptical outer peripheral surface, and a roller bearing. The outer peripheral surface of the plug is provided with a major-axis-side outer-peripheral surface portion formed at a major axis position L1, and a minor-axis-side outer-peripheral surface portion formed at a minor axis position L2. The major-axis-side outer-peripheral surface portion is a tapered surface that is tapered along a center axis line, and the minor-axis-side outer-peripheral surface portion is an inverted tapered surface that is tapered in the opposite direction. An externally toothed gear can be supported and flexed into an elliptical shape without partial contact by using the wave generator in which the roller bearing is used.

6 Claims, 3 Drawing Sheets

(58) Field of Classification Search
USPC .......................................................... 74/640
See application file for complete search history.

(56) References Cited

U.S. PATENT DOCUMENTS

| | | | |
|---|---|---|---|
| 8,888,374 B1 * | 11/2014 | Nien .................... | F16H 49/001 384/513 |
| 2003/0115983 A1 | 6/2003 | Wang et al. | |
| 2004/0025629 A1 | 2/2004 | Poehlau | |

FOREIGN PATENT DOCUMENTS

| | | |
|---|---|---|
| JP | 2004-513306 A | 4/2004 |
| JP | 2011-002084 A | 1/2011 |
| JP | 2011-190826 | 9/2011 |

OTHER PUBLICATIONS

Written Opinion (PCT/ISA/237) dated Mar. 3, 2015, by the Japanese Patent Office as the International Searching Authority for International Application No. PCT/JP2014/080959 (3 pages).

* cited by examiner

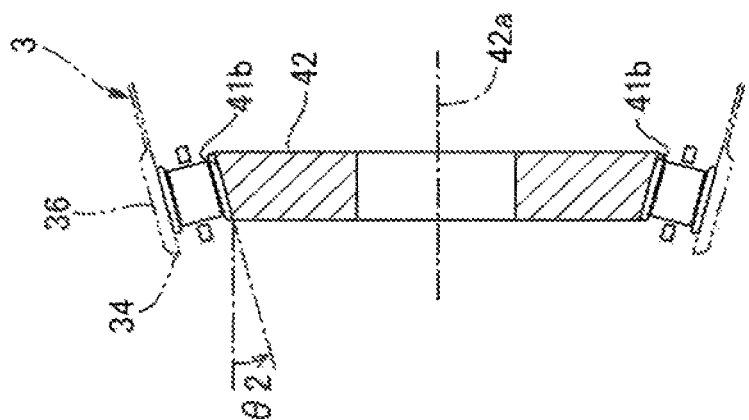
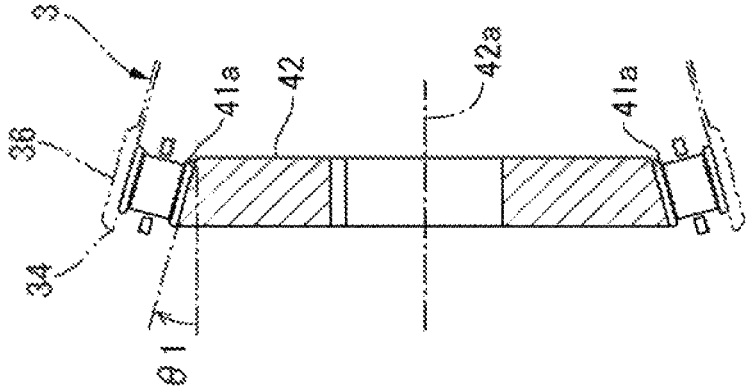
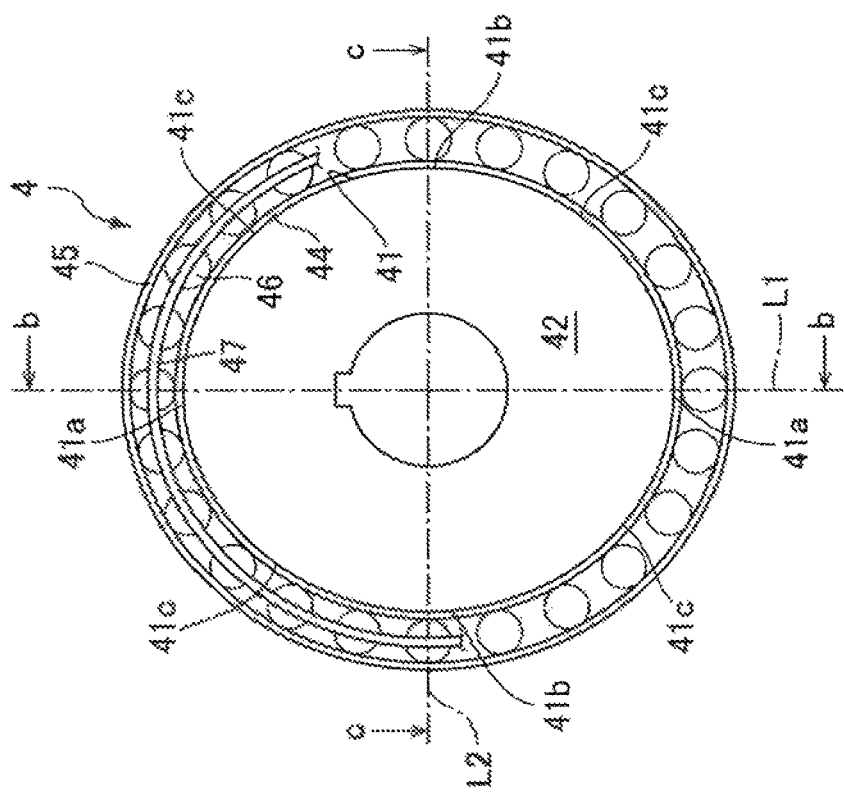

ON MAJOR AXIS

ON MINOR AXIS

WAVE GENERATOR AND STRAIN WAVE GEARING

TECHNICAL FIELD

The present invention relates to a wave generator of a strain wave gearing, and specifically to a wave generator for use in a strain wave gearing provided with a cup shaped or silk-hat-shaped flexible externally toothed gear.

BACKGROUND ART

A wave generator of a strain wave gearing is provided with a rigid plug and a wave bearing mounted on the elliptically-shaped outer circumferential surface of the plug. Patent document 1 proposes a wave generator employing a needle roller bearing for a wave bearing.

PRIOR ART DOCUMENT

Patent Document

Patent Document 1: JP 2011-190826 A

SUMMARY OF THE INVENTION

Problems to be Solved by the Invention

A conventional wave generator employing a roller bearing is adopted in a strain wave gearing which is provided with a cylindrical externally toothed gear and is called as a flat type. If the wave generator of this configuration is adopted in a cup-type or silk-hat-type strain wave gearing provided with a cup-shaped or silk-hat-shaped externally toothed gear, such defects as below may occur.

When the externally toothed gear having a cup shape or a silk-hat shape is flexed in its external-tooth forming part into an elliptical shape by the wave generator, a three-dimensional flexing state occurs in the externally toothed gear. FIG. 3(a) shows a situation in which a cup-shaped externally toothed gear is flexed into an elliptical shape, wherein a solid line depicts a state before flexing, one-dot chain line depicts a flexed state in a section including the major axis of the ellipsoid, and a two-dot chain line depicts a flexed state in a section including a minor axis of the ellipsoid.

As shown in this figure, in the externally toothed gear 100, a cylindrical-shaped external-tooth forming portion 102 at the side of an open end 101 is flexed by a wave generator. The flexing amount is changed in approximate proportion to the distance from the open end 101 in a direction from the side of the open end 101 toward the side of a diaphragm in the externally toothed gear 100. The cylindrical-shaped external-tooth forming portion 102 is flexed outward in the radial direction at the major-axis side of the elliptical shape, as show by the one-dot chain line, whereas it is flexed inward in the radial direction at the minor-axis side of the shape as shown by the two-dot chain line.

Each position of the external-tooth forming portion 102 in the circumferential direction thereof is repeatedly flexed in the radial direction between a range from the position indicated by the one-dot chain line to the position indicate by the two-dot chain line in accordance with rotation of the wave generator. The three-dimensional flexing state of the externally toothed gear, which is caused by the rotation of the wave generator, is called as a "corning", the shape of this flexing state is called as a "corning shape", and a flexing angle of the portion where the corning occurs with respect to the center axis line is called as a "corning angle".

In a case where a widely-used wave generator employing a ball bearing is used the wave bearing, the outer peripheral part of a wave generator 104 (an outer race of the wave bearing), which supports the external-tooth forming portion 102 of the externally toothed gear 100, can be inclined in accordance with the coming, as shown in FIG. 3(e). In contrast, in a case where a roller bearing 106 is employed instead, the outer peripheral part 108 of the wave generator 107 is supported parallel to the direction of the center axis line by respective rollers 109, as shown in FIGS. 3(b) to 3(d). Therefore, except for the middle position between the major axis position and the minor axis position shown in FIG. 3(c), the outer peripheral part cannot follow the corning shape of the external-tooth forming portion in the cup-shaped or silk-hat-shaped externally toothed gear, as in cases of the major axis position in FIG. 3(b) and the minor axis position in FIG. 3(d).

Therefore, the outer peripheral surface of the wave generator 107 employing the roller bearing 106 comes into strong contact with the diaphragm side on the major axis of the elliptical shape of the externally toothed gear 100 as shown by an arrow in FIG. 3(b), while it comes into strong contact with the open-end side on the minor axis as shown by an arrow in FIG. 3(d), which causes to occur deviation in the contact area. As a result, the significant characteristics of the strain wave gearing including angle transmission error and positioning accuracy are deteriorated. There will also arise concerns about decrease in lifetime and increase in frictional wear of the strain wave gearing.

In view of the above, an object of the present invention is to provide a wave generator employing, a roller bearing, which is capable of following a three-dimensional flexing of a cup-shaped or silk-hat-shaped externally toothed gear, and to provide a stain wave gearing employing the wave generator.

Means of Solving the Problems

In order to solve the above problems, according to the present invention, there is provided a wave generator of a strain wave gearing, which makes a cup-shaped or silk-hat-shaped externally toothed gear to flex into an elliptical shape and partially mesh with a rigid internally toothed gear, the wave generator comprising a rigid plug having an elliptical outer peripheral surface, and a roller bearing mounted on the outer peripheral surface of the plug. The outer peripheral surface of the plug has a major-axis-side outer-peripheral surface portion formed on a major-axis position thereof, and a minor-axis-side outer-peripheral surface portion formed on a minor-axis position thereof. The major-axis-side outer-peripheral surface portion is a tapered surface that is tapered toward a first direction along a center axis line of the plug, and the minor-axis-side outer-peripheral surface portion is an inverted tapered surface that is tapered toward a second direction opposite to the first direction along the center axis line.

It is preferable that the outer peripheral surface of the plug is formed so that the circumferential length of the elliptical outline in each axis-perpendicular section in the direction of the center axis is equal with one another.

In the wave generator of the present invention, in accordance with the corning shape of the externally toothed gear which is flexed into an elliptical shape, the major-axis-side outer-peripheral surface portion and the minor-axis-side outer-peripheral surface portion of the plug outer surface are formed with tapers its opposite direction with each other. Accordingly, the rollers of the roller bearing mounted on the outer peripheral surface of the plug are supported in a state inclined in the same direction. Therefore, it is possible to make the roller bearing to contact with the inner peripheral surface of the externally toothed gear in a state in which partial contact is avoided or suppressed.

As a result, it is possible to reduce wear in the contact portions between the externally toothed gear and the wave generator, and suppress decrease in lifetime of these parts. It is also possible to reduce skew of rollers and to improve rolling fatigue lifetime thereof. Further, the externally toothed gear is surely supported by the wave generator, so that it is possible to prevent degradation of angle transmission errors and positioning accuracy of the strain wave gearing which is caused by partial contact between the wave generator and the externally toothed gear.

In the wave generator of the present invention, it is preferable that the outer peripheral surface of the plug is provided with different taper angles at respective positions in the circumferential direction thereof, and that each taper angle is an angle corresponding to the corning angle in each position in the circumferential direction of the external-tooth forming portion when a prescribed position in the tooth trace direction of the tooth-forming portion of the externally toothed gear is flexed into a predetermined elliptical shape. With this, it is possible to make the roller bearing, to contact with the inner peripheral surface of the externally toothed gear in each position in the circumferential direction without partial contact.

In the wave generator of the present invention, the inner race of the roller bearing may be integrally formed in the plug. In this case, the outer peripheral surface functions as the inner-race raceway.

Next, a strain wave gearing of the present invention has a rigid internally toothed gear, a cup-shaped or silk-hat-shaped flexible externally toothed gear, and a wave generator that flexes the externally toothed gear to mesh with the internally toothed gear and moves meshing positions in a circumferential direction, wherein the wave generator is the above-mentioned wave generator.

The outer race of the roller bearing of the wave generator can be integrally formed in the external-tooth forming portion of the externally toothed gear.

BRIEF DESCRIPTION OF THE DRAWINGS

FIG. 2(a) is a schematic front view of a wave generator, FIG. 2(b) is a schematic sectional view at the major-axis position of the wave generator, and FIG. 2(c) is a schematic sectional view at the minor-axis position of the wave generator.

MODE FOR CARRYING OUT THE INVENTION

An embodiment of a strain wave gearing according to the present invention will be described below with reference to the accompanying drawings.

[Overall Configuration]

Figure 1B:
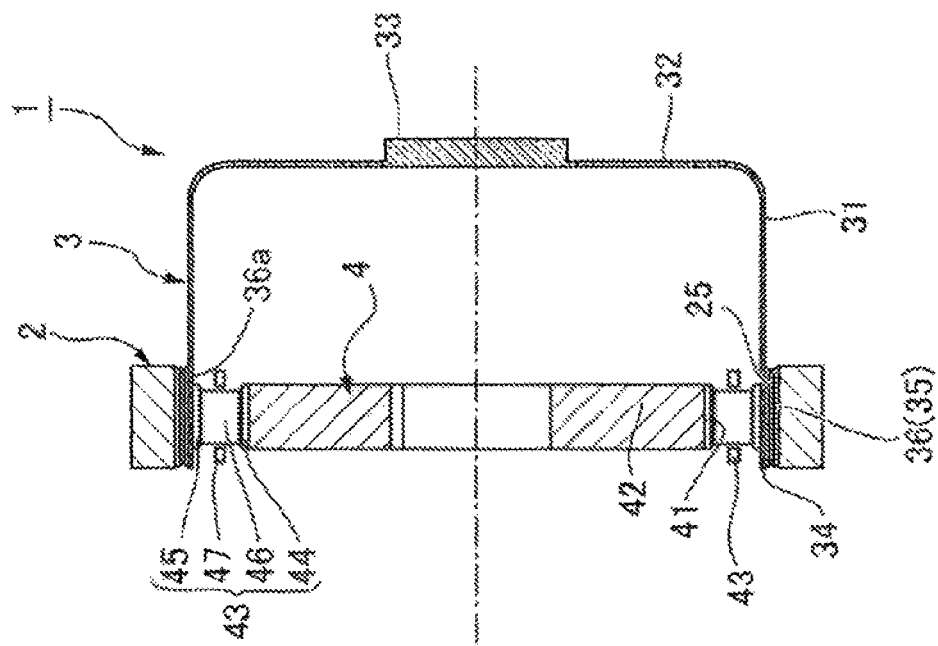
FIG. 1(b) is a schematic sectional view thereof.
Figure 1A:
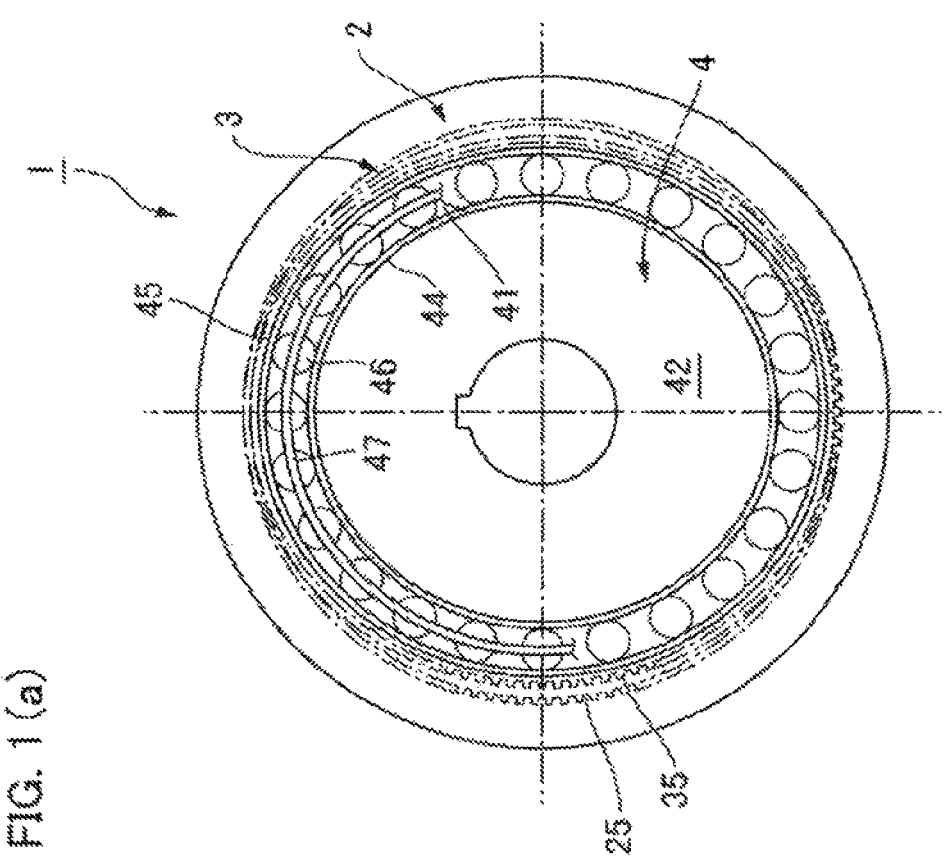
FIG. 1(a) is a front view of a cup-type strain wave bearing according to the present invention.
Figure 3A:
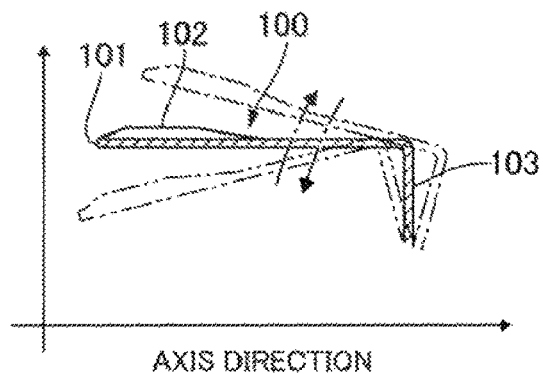
FIG. 3(a) is an explanatory view showing a flexing state of the strain wave gearing.
Figure 3B:
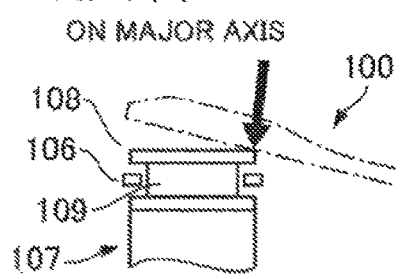
FIG. 3(b) to 3(e) are explanatory views showing contact states between the wave generator and the externally toothed gear, respectively.
Figure 3C:
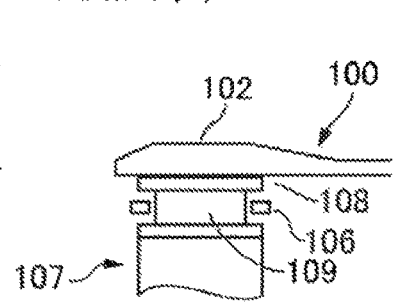
Figure 3D:
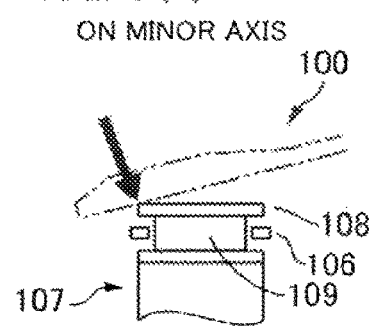
Figure 3E:
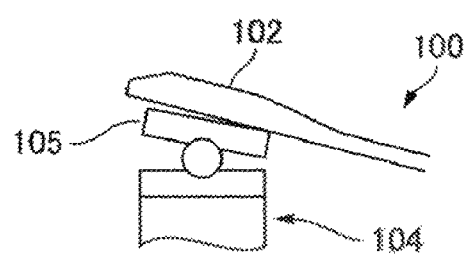

FIG. 1(a) is a schematic front view of a cup-type strain wave gearing, and FIG. 1(b) is a schematic longitudinal sectional view thereof. The cup-type strain wave gearing 1 has an annular rigid internally toothed gear 2, a cup-shaped flexible externally toothed gear 3 coaxially disposed inside the rigid internally toothed gear, and an elliptical-contoured wave generator 4 fitted into the externally toothed gear.

The externally toothed gear 3 has a cylindrical body part 31, a discoid diaphragm 32 continued to an end of the body part, a disk-shaped boss 33 integrally formed on the center portion of the diaphragm 32, and external teeth 35 formed on the outer peripheral surface of the open part 34 of the body part 31. An external-tooth forming portion 36 of the externally toothed gear 3 is flexed into an elliptical shape by the wave generator 4, whereby external teeth 35 located on both end portions in the major axis direction of the elliptical shape mesh with the internal teeth 25 of the internally toothed gear 2.

When the wave generator 4 is rotated by a motor or the like, the meshing positions between the both gears 2 and 3 move in the circumferential direction. The difference in teeth between the gears 2 and 3 is 2n (n is a positive integer), in which there is generated a relative rotation between the gears 2 and 3, the angle of relative rotation during one rotation of the wave generator being corresponding to the tooth difference between the both gears.

The wave generator 4 has a rigid plug 42 formed with an elliptical outer peripheral surface 41, and a roller bearing 43 mounted on the outer peripheral surface 41 of the plug 41. The roller bearing 43 has an inner race 44 fitted on the outer peripheral surface 41 of the wave generator 4, an outer race 45 for supporting an inner peripheral surface 36a of the external-tooth forming portion 36 of the externally toothed gear 3, and a plurality of rollers 46 mounted in a rotatable state between the inner race 44 and the outer race 45. The rollers 46 are held at intervals of equal angle in the circumferential direction by means of a cylindrical retainer 47.

(Shape of Plug Outer Peripheral Surface)

FIG. 2(a) is a schematic front view of the wave generator 4, FIG. 2(b) is a schematic longitudinal sectional view of the wave generator cut along the major-axis position thereof, and FIG. 2(c) is a schematic longitudinal sectional view of the wave generator cut along the minor-axis position thereof. The shape of the plug outer peripheral surface 41 is shown in an exaggerated manner in FIGS. 2(b) and (c).

Referring to these drawings, the outer peripheral surface 41 of the plug 42 is set so that the elliptical outline in each axis-perpendicular section in the direction of the center axis line 42a has the same circumferential length. Further, the outer peripheral surface 41 has a major-axis-side outer-peripheral surface portion 41a including the major axis position L1, a minor-axis-side outer-peripheral surface portion 41b including the minor axis position L2, and an outer-peripheral surface portion 41c formed therebetween.

The major-axis-side outer-peripheral surface portion 41a is a tapered surface that is tapered by a first taper angle θ toward a first direction along the center axis line 42a of the plug 42. Specifically, the outer diameter thereof gradually decreases toward the side of the diaphragm 32 (refer to FIG. 1(b)) from the side of the open part 34 of the externally toothed gear 3. The minor-axis-side outer-peripheral surface portion 41b is an inverted tapered surface that is tapered by a second taper angle θ2 toward a second direction opposite to the first direction in the center axis line 42a. Specifically, the outer diameter thereof gradually decreases toward the side of the open part 34 from the side of the diaphragm 32.

The absolute values of the angles θ1 and θ2 are the same in general. The outer-peripheral surface portion 41c between the major-axis-side outer-peripheral surface portion 41a and the minor-axis-side outer-peripheral surface portion 41b has a taper angle that is smoothly shifted front the first taper angle θ1 to the second taper angle θ2.

Thus-shaped outer peripheral surface 41 of the plug 42 can be designed by the following procedures, for example. First, based on a preset elliptical amount for the strain wave gearing 1, the major-axis dimension and the minor-axis dimension at the center position in the axis line direction of the roller bearing 43, and the circumferential length are confirmed. Next, the corning angle of the inner peripheral surface of the external-tooth forming portion 36 of the externally toothed gear 3 is confirmed based on the preset elliptical amount for the strain wave gearing 1. Next, based on the confirmed corning angle, the major-axis dimension is decided for each axis-perpendicular section in the direction of the center axis line 42a of the outer peripheral surface 41 of the plug 42. Then, the minor-axis dimension for each axis perpendicular section without changing the circumferential length of the elliptical shape.

As a result, it is obtained the plug 42 having the outer peripheral surface 41 formed with a tapered surface, the taper angle of which is different in each position in the circumferential direction of the outer peripheral surface. The taper angle in each position becomes an angle corresponding to the corning angle in each position in the circumferential direction when the external-tooth forming portion 36 of the externally toothed gear 3 is flexed into an elliptical shape.

As described above, the outer peripheral surface 41 of the plug 42 is a three-dimensional tapered surface that corresponds to the coming shape of the inner peripheral surface of the tooth-forming portion 36 of the externally toothed gear 3. Therefore, the outer race 45 of the roller bearing of the wave generator 4 is formed with the outer peripheral surface that is capable of supporting the external-tooth forming portion 36 in a state in contact with the inner peripheral surface of the external-tooth forming portion 36 without partial contact.

In the above example, it is possible to integrally form the inner race 44 of the roller bearing in the plug 42 of the wave generator 4. In this case, the outer peripheral surface 41 having a three-dimensional tapered shape of the plug 42 becomes the inner-race raceway, on which each roller 46 is supported.

Further, in the above example, the outer race 45 of the roller bearing can be integrally formed in the inner peripheral surface portion of the external-tooth forming portion 36 of the externally toothed gear 3. In this case, the inner peripheral surface 36a of the external-tooth forming portion 36 functions as the outer-race raceway.

In the above example, the present invention is applied to the cup-type strain wave gearing. The present invention can also be applied to the silk-hat-type strain wave gearing in a similar manner.

The invention claimed is:

1. A wave generator of a strain wave gearing, which makes a cup-shaped or silk-hat-shaped externally toothed gear to flex into an elliptical shape and partially mesh with a rigid internally toothed gear, the wave generator comprising:
   a rigid plug having an elliptical outer peripheral surface; and
   a roller bearing mounted on the outer peripheral surface of the plug,
   wherein the outer peripheral surface of the plug has:
   a tapered surface that is tapered toward a first direction along a center axis line of the plug on a major axis position of the outer peripheral surface; and
   an inverted tapered surface that is tapered toward a second direction opposite to the first direction along the center axis line on a minor axis position of the outer peripheral surface.

2. The wave generator of the strain wave gearing according to claim 1, wherein the outer peripheral surface of the plug is formed so that an elliptical outline in each axis-perpendicular section in a center axis direction has a same circumferential length.

3. The wave generator of the strain wave gearing according to claim 1,
   wherein the outer peripheral surface of the plug is tapered so as to have a different taper angle on each position in a circumferential direction thereof, and
   each taper angle corresponds to a corning angle on each corresponding position in a circumferential direction of an external-tooth forming portion, in which the corning angle is obtained when the external-tooth forming portion of the externally toothed gear is flexed at a predetermined position in a tooth trace direction into a predetermined elliptical shape.

4. The wave generator of the strain wave gearing according to claim 1,
   wherein an inner race of the roller bearing is integrally formed in the plug, and
   the outer peripheral surface is an inner-race raceway.

5. A strain wave gearing comprising:
   a rigid internally toothed gear;
   a cup-shaped or a silk-hat-shaped flexible externally toothed gear; and
   a wave generator for flexing the externally toothed gear into an elliptical shape and meshing with the internally toothed gear, and for moving meshing positions between the both gears in a circumferential direction,
   wherein the wave generator is one that is defined in claim 1.

6. The strain wave gearing according to claim 5, wherein an outer race of the roller bearing of the wave generator is integrally formed in an external-tooth forming portion of the externally toothed gear.

* * * * *